United States Patent

Sörensen et al.

Patent Number: 5,663,247
Date of Patent: Sep. 2, 1997

[54] HYPERBRANCHED MACROMOLECULE FROM EPOXIDE NUCLEUS AND HYDROXY-FUNCTIONAL CARBOXYLIC ACID CHAIN EXTENDERS

[75] Inventors: Kent Sörensen, Perstorp; Bo Pettersson, Helsingborg, both of Sweden

[73] Assignee: Perstorp AB, Perstorp, Sweden

[21] Appl. No.: 547,447

[22] Filed: Oct. 24, 1995

[51] Int. Cl.$^6$ .............. C08G 59/14; C08G 59/16; C08G 63/66

[52] U.S. Cl. .............. 525/533; 525/403; 525/404; 525/408; 525/409; 525/502; 525/504; 525/507; 525/508; 525/528; 525/529; 525/530; 525/531; 525/532; 424/DIG. 16

[58] Field of Search .............. 424/DIG. 16; 525/533, 525/403, 404, 408, 409, 502, 504, 507, 508, 528, 529, 530, 531, 532

[56] References Cited

U.S. PATENT DOCUMENTS

| | | | |
|---|---|---|---|
| 5,041,516 | 8/1991 | Frechet et al. | 424/DIG. 16 |
| 5,196,502 | 3/1993 | Turner et al. | 424/DIG. 16 |
| 5,418,301 | 5/1995 | Hult et al. | 525/437 |
| 5,527,524 | 6/1996 | Tomalia et al. | 424/DIG. 16 |

FOREIGN PATENT DOCUMENTS

| | | |
|---|---|---|
| WO93/17060 | 9/1993 | WIPO . |
| WO93/18079 | 9/1993 | WIPO . |

OTHER PUBLICATIONS

WPAT accession No. 96–067603/07 for Swedish Patent No. 502634, Perstorp AB. Nov. 1995.
Tomalia, et al. *Agnew. Chem Int. Ed.*, 138–175 (1990).

*Primary Examiner*—Robert E. Sellers
*Attorney, Agent, or Firm*—Scully, Scott, Murphy & Presser

[57] ABSTRACT

A hyperbranched macromolecule of polyester type comprising a central monomeric or polymeric nucleus and at least one generation of a branching chain extender having at least three reactive sites of which at least one is a hydroxyl or hydroxyalkyl substituted hydroxyl group and at least one is a carboxyl or terminal epoxide group. The nucleus is an epoxide compound having at least one reactive epoxide group. Optionally, the macromolecule comprises at least one generation consisting of at least one spacing chain extender having two reactive sites of which one is a hydroxyl or hydroxyalkyl substituted hydroxyl group and one is a carboxyl or terminal epoxide group. The macromolecule may be terminated by means of at least one chain stopper.

20 Claims, No Drawings

HYPERBRANCHED MACROMOLECULE FROM EPOXIDE NUCLEUS AND HYDROXY-FUNCTIONAL CARBOXYLIC ACID CHAIN EXTENDERS

The present invention relates to a hyperbranched macromolecule of polyester type, having a dendritic or near dendritic structure. The macromolecule comprises a central epoxide nucleus from which chain extenders form a branched structure corresponding to at least one generation (as defined below). The macromolecule is, furthermore, optionally terminated by means of at least one chain stopper. The present invention also comprises a process of preparing said macromolecule.

Hyperbranched and dendritic macromolecules (dendrimers) can generally be described as three dimensional highly branched molecules having a tree-like structure. Dendrimers are highly symmetric, while similar macromolecules designated as hyperbranched may to a certain degree hold an asymmetry, yet maintaining the highly branched tree-like structure. Dendrimers can be said to be monodisperse variations of hyperbranched macromolecules. Hyperbranched and dendritic macromolecules normally consist of an initiator or nucleus having one or more reactive sites and a number of surrounding branching layers and optionally a layer of chain terminating molecules. The layers are usually called generations, a designation hereinafter used.

The composition of hyperbranched dendritic or near dendritic macromolecules having three generations can be illustrated by below Formulas (I) and (II):

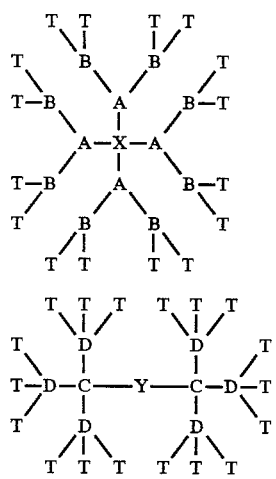

wherein

X and Y are an initiator or nucleus having four and two reactive sites, respectively, and A, B, C and D are chain extenders having three (A and B) and four (C and D) reactive sites, each extender forming one generation in the macromolecule.

T is a terminating chain stopper forming the third and last generation. T may either be monofunctional or give a suitable terminal functionality, consisting for instance of hydroxyl, carboxyl or epoxide groups, to the macromolecule. T may also be a moiety of a saturated or unsaturated compound, such as an air drying fatty acid or a derivative thereof.

Hyperbranched macromolecules of the polyester type give, due to the symmetrical or near symmetrical highly branched structure, in comparison to ordinary polyesters great advantages. Hyperbranched macromolecules exhibit especially in comparison to branched, but also linear, polyesters a low polydispersity. A hyperbranched macromolecule can, due to the structure, be formulated to give a very high molecular weight and yet exhibit a very low viscosity, thus being suitable as component in compositions such as coatings and the like in order to increase the solid content.

Alkyds are typical examples of ordinary polyesters and have a very large commercial significance as for instance paint binders. The structural composition of an alkyd can be illustrated by below Formula (III):

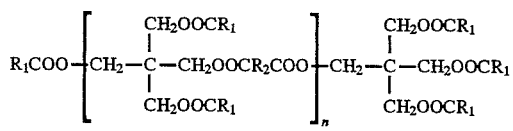

wherein $R_1$ is the alkyl moiety of an unsaturated fatty acid reactive to air oxygen thereby providing the polyester with air drying properties;

$R_2$ is the alkyl or aryl moiety of a difunctional carboxylic acid;

n is the average degree of polymerisation.

An alkyd is a high molecular and contrary to the hyperbranched macromolecules a randomly branched compound with a broad polydispersity not illustrated by the simplified Formula (III). Alkyds exhibits due to this normally a very high viscosity and substantial amounts of solvents must thus be added to obtain so low a viscosity that they can be utilised.

Further examples of ordinary polyesters are saturated polyesters. They are in principal composed similar to Formula (III), but with the difference that $R_1$ is the alkyl moiety of a saturated monofunctional acid and that they contain unreacted hydroxyl groups. Curing is performed by crosslinking between the unreacted hydroxyl groups and for instance a melamine resin. The demand for viscosity reducing solvents is in this case also high.

Polyesters, including alkyds, having a high molecular weight and a high degree of branching, which are necessary to give good performance characteristics, as well as having so low a viscosity that they can be used solventless or with only a very small addition of solvents, can be obtained if polyesters are formulated as hyperbranched macromolecules. It is thus obvious that macromolecules such as according to the present invention give great advantages from an environmental point of view.

Various dendritic macromolecules are i.a. described by Tomalia et al in Angew. Chem. Int. Ed. Engl. 29 pages 138–175 (1990) and in the U.S. Pat. No. 5,418,301 Hult et al.

Dendritic macromolecules different from the macromolecules of the present invention are disclosed in said references. Tomalia et al discloses the preparation of polyamide amines of the dendrimer type. $NH_3$ is used as initiator molecule and methyl acrylate and ethylene diamine as chain extenders. The yielded macromolecules are $NH_2$ terminated. Chain stoppers are not used.

U.S. Pat. No. 5,418,301 (Hult et al) discloses a dendritic macromolecule of the polyester type. The macromolecule includes as central initiator molecule or initiator polymer a compound having one or more reactive hydroxyl groups and as chain extender a hydroxyfunctional carboxylic acid having at least one carboxyl group and at least two hydroxyl groups.

The macromolecule according to the present invention enhances filmproperties quite different from corresponding properties obtained by above discussed hyperbranched macromolecules as well as different from conventional molecules of polyester type. Surface properties, such as drying time, hardness and scratch resistance are for instance markedly increased.

The present invention refers to a dendritic or near dendritic hyperbranched macromolecule of the polyester type, having a central monomeric or polymeric nucleus consisting of an epoxide compound with at least one reactive epoxide group. At least one generation of the macromolecule consists of a branching monomeric or polymeric chain extender having at least three reactive sites, of which at least one is a hydroxyl group or a hydroxyalkyl substituted hydroxyl group and at least one is a carboxyl group or a terminal epoxide group. The macromolecule can optionally comprise at least one generation consisting of a spacing monomeric or polymeric chain extender having two reactive sites, being one hydroxyl group or hydroxyalkyl substituted hydroxyl group and one carboxyl group or terminal epoxide group. The macromolecule may furthermore be terminated by means of at least one monomeric or polymeric chain stopper.

The central monomeric or polymeric nucleus included in the hyperbranched macromolecule according to the present invention, is suitably selected from the group consisting of:

i) a glycidyl ester of a saturated monofunctional carboxylic or fatty acid with 1–24 carbon atoms;

ii) a glycidyl ester of an unsaturated monofunctional carboxylic or fatty acid with 3–24 carbon atoms;

iii) a glycidyl ester of a saturated or unsaturated di, tri or polyfunctional carboxylic acid with 3–24 carbon atoms;

iv) a glycidyl ether of a saturated monofunctional alcohol with 1–24 carbon atoms;

v) a glycidyl ether of an unsaturated monofunctional alcohol with 2–24 carbon atoms;

vi) a glycidyl ether of a saturated or unsaturated di, tri or polyfunctional alcohol with 3–24 carbon atoms;

vii) a glycidyl ether of a phenol or a reaction product thereof;

viii) a glycidyl ether of a condensation product between at least one phenol and at least one aldehyde or an oligomer of such a condensation product;

ix) a mono, di or triglycidyl substituted isocyanurate;

x) an epoxide of an unsaturated monocarboxylic acid or fatty acid or corresponding triglyceride, which acid has 3–24 carbon atoms;

xi) a reaction product between a glycidyl or epoxide ester or ether having x epoxide groups and a saturated or unsaturated aliphatic or cycloaliphatic carboxylic acid having y carboxylic groups, whereby x is an integer between 2–20, y is an integer between 1–10 and whereby x–y>=1;

xii) a reaction product between a glycidyl or epoxide ester or ether having x epoxide groups and an aromatic carboxylic acid having y carboxylic groups, whereby x is an integer between 2–20, y is an integer between 1–10 and whereby x–y>=1;

xiii) a reaction product between a glycidyl or epoxide ester or ether having x epoxide groups and an aliphatic, cycloaliphatic or aromatic hydroxyfunctional saturated or unsaturated carboxylic acid having y carboxyl groups, whereby x is an integer between 2–20, y is an integer between 1–10 and whereby x–y>=1;

xiv) an aliphatic, cycloaliphatic or aromatic epoxypolymer; and xv) an epoxidized polyolefine.

Above compounds can be exemplified by glycidyl ethers such as 1,2-epoxy-3-allyloxypropane, 1-allyloxy-2,3-epoxypropane, 1,2-epoxy-3-phenoxypropane, 1-glycidyloxy-2-ethylhexane and glycidyl esters such as the Cardura® compounds, which compounds are glycidyl esters of a highly branched saturated synthetic monocarboxylic acid called Versatic® acid (Cardura and Versatic acid are trademarks of Shell Chemicals).

Glycidyl esters and ethers can be characterised by the general formulas (IV) and (V) for esters and ethers, respectively:

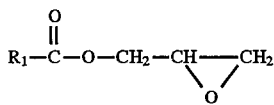

Formula (IV)

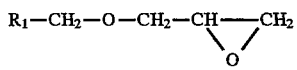

Formula (V)

wherein $R_1$ normally is hydrogen, straight or branched alkyl, cycloalkyl, aryl or alkylaryl.

Other examples of a suitable nucleus are diglycidyl ether of bisphenol A and reaction products thereof, diglycidyl terephthalate, epoxidized soybean fatty acid or oil, epoxidized polyvinylalcohol, epoxidized polyvinylacrylates and epoxy resins such as 3,4-epoxy-cyclohexyl methyl 3,4-epoxy cyclohexane carboxylate.

A suitable polymeric nucleus is also to be found among reaction products between epoxide esters or ethers and carboxylic acids with different number of reactive sites with regard to epoxide groups and carboxyl groups, such as a reaction product of a diepoxide and a monocarboxylic acid, whereby a product being epoxide functional are yielded.

The hydroxyalkyl substituted hydroxyl groups in a branching or spacing chain extender, as used according to the present invention, has preferably the general formula

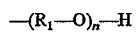

Formula (VI)

wherein $R_1$ is ethyl, propyl, butyl or mixtures thereof and n is an integer between 1 and 100, preferably between 1 and 30. One or more alkyl moieties can in certain cases be replaced by equivalent numbers of alkylaryl moieties, such as ethylphenyl.

A branching chain extender used according to the invention is suitably selected from the group consisting of:

i) an aliphatic di, tri or polyhydroxyfunctional saturated or unsaturated monocarboxylic acid;

ii) a cycloaliphatic di, tri or polyhydroxyfunctional saturated or unsaturated monocarboxylic acid;

iii) an aromatic di, tri or polyhydroxyfunctional monocarboxylic acid;

iv) an aliphatic monohydroxyfunctional saturated or unsaturated di, tri or polycarboxylic acid;

v) a cycloaliphatic monohydroxyfunctional saturated or unsaturated di, tri or polycarboxylic acid;

vi) an aromatic monohydroxyfunctional di, tri or polycarboxylic acid; and vii) an ester comprising two or more of the hydroxyfunctional carboxylic acids of i) through vi).

The branching chain extender is in preferred embodiments 2,2-dimethylolpropionic acid, α,α-bis (hydroxymethyl)-butyric acid, α,α,α-tris(hydroxymethyl)-acetic acid, α,α-bis(hydroxymethyl)-valeric acid, α,α-bis (hydroxymethyl)-propionic acid, α,β-dihydroxypropionic acid, heptonic acid, citric acid, d- or l-tartaric acid, dihydroxymaloic acid, d-gluconic acid or α-phenylcarboxylic acids having at least two hydroxyl groups directly pendant to the phenyl ring (phenolic hydroxyl groups) such as 3,5-dihydroxybenzoic acid. In an especially preferred embodiment, the branching chain extender is 2,2-dimethylolpropionic acid.

The hyperbranched macromolecule comprises in certain embodiments of the present invention at least one generation consisting of at least one spacing monomeric or polymeric chain extender. In such embodiments, said chain extender is suitably selected from the group consisting of:

i) an aliphatic monohydroxyfunctional saturated or unsaturated monocarboxylic acid;

ii) a cycloaliphatic monohydroxyfunctional saturated or unsaturated monocarboxylic acid;

iii) an aromatic monohydroxyfunctional monocarboxylic acid;

iv) an ester comprising two or more of the hydroxyfunctional carboxylic acids of i) through iii);

v) a lactone; and vi) a linear polyester or polyether.

The spacing chain extender is, in preferred embodiments of the present invention, hydroxyvaleric acid, hydroxypropionic acid, hydroxypivalic acid, glycolide, δ-valerolactone, β-propiolactone or ε-caprolactone.

Hydroxyfunctional carboxylic acids wherein one or more hydroxyl groups are hydroxyalkyl substituted in accordance with Formula (VI) are, dependant on the number of reactive sites, suitable as either spacing or branching chain extenders.

Unreacted functional sites in the nucleus or in a chain extender constituting the last or terminal extending generation of a macromolecule according to the present invention, can of course to a larger or smaller extent be reacted with one or more monomeric or polymeric chain stoppers. Important aspects on the use and choice of chain stoppers are for instance the desired final properties of the prepared macromolecule and type and number of unreacted functional sites in the chain extender. A chain stopper can also provide a suitable terminal functionality consisting of for instance hydroxyl, carboxyl and/or epoxide groups.

In embodiments of the present invention, wherein the macromolecule is chain terminated, a chain stopper is advantageously selected from the group consisting of:

i) an aliphatic or cycloaliphatic saturated or unsaturated monofunctional carboxylic acid or, where applicable, an anhydride thereof;

ii) a saturated or unsaturated fatty acid;

iii) an aromatic monofunctional carboxylic acid;

iv) a diisocyanate, an oligomer or an adduct thereof;

v) an epihalohydrin;

vi) a glycidyl ester of a monofunctional carboxylic or fatty acid with 1–24 carbon atoms;

vii) a glycidyl ether of a monofunctional alcohol with 1–24 carbon atoms;

viii) an adduct of an aliphatic or cycloaliphatic saturated or unsaturated mono, di, tri or polyfunctional carboxylic acid or, where applicable, an anhydride thereof;

ix) an adduct of an aromatic mono, di, tri or polyfunctional carboxylic acid or, where applicable, an anhydride thereof;

x) an epoxide of an unsaturated monocarboxylic acid or fatty acid or corresponding triglyceride, which acid has 3–24 carbon atoms;

xi) an aliphatic or cycloaliphatic saturated or unsaturated monofunctional alcohol;

xii) an aromatic monofunctional alcohol;

xiii) an adduct of an aliphatic or cycloaliphatic saturated or unsaturated mono, di, tri or polyfunctional alcohol; and xiv) an adduct of an aromatic mono, di, tri or polyfunctional alcohol.

A chain stopper selected among saturated or unsaturated monofunctional carboxylic acids or fatty acids can be linear or branched and can be employed as acid or, where applicable, as anhydride. Examples are acetic acid, propionic acid, butyric acid, valeric acid, isobutyric acid, trimethylacetic acid, caproic acid, caprylic acid, capric acid, heptanoic acid, crotonic acid, acrylic acid, methacrylic acid, benzoic acid, para-tert.butylbenzoic acid, pelargonic acid, lauric acid, myristic acid, palmitic acid, stearic acid, behenic acid, lignoceric acid, cerotic acid, montanoic acid, isostearic acid, isononanoic acid, abietic acid, sorbinic acid, 2-ethylhexanoic acid, oleic acid, ricinoleic acid, linoleic acid, linolenic acid, erucic acid, soybean fatty acid, linseed fatty acid, dehydrated castor fatty acid, tall oil fatty acid, tung oil fatty acid, sunflower fatty acid and/or safflower fatty acid.

Diisocyanates can be exemplified by toluene-2,4-diisocyanate, toluene-2,6-diisocyanate, diphenylmethane diisocyanate, hexamethylene diisocyanate, isophorone diisocyanate, 4,4-diisocyanato-dicyclohexylmethane, 1,5-diisocyanato-naphthaline, 1,4-phenylene diisocyanate, tetramethyl xylene diisocyanate, 1-isocyanato-3,3,5-trimethyl-5-isocyanatomethyl cyclohexane, 1,4-diisocyanate cyclohexane, 1,3-diisocyanate benzene and 1,4-diisocyanate benzene.

Adducts of carboxylic acids and alcohols can, furthermore, be used as chain stoppers. Such chain stoppers are for instance adducts with hydroxyethyl acrylate and hydroxypropyl acrylate, trimethylolpropane diacrylate, pentaerythritol diacrylate, pentaerythritol triacrylate, acrylates of alkoxylated trimethylolpropane and pentaerythritol. Further examples are adducts with hydroxysubstituted allyl ethers such as trimethylolpropane diallyl ether maleate.

Epihalohydrins such as 1-chloro-2,3-epoxypropane and 1,4-dichloro-2,3-epoxy butane, is a further group of suitable chain stoppers, yielding epoxide functional hyperbranched macromolecules. Epoxide functional macromolecules can, also, be prepared through epoxidation of unsaturation within the macromolecules.

Monofunctional alcohols are most suitably aliphatic or cycloaliphatic and can be exemplified by 5-methyl-1,3-dioxane-5-methanol, 5-ethyl-1,3-dioxane-5-methanol, trimethylolpropane diallyl ether and pentaerythritol triallyl ether.

Glycidyl esters of monofunctional carboxylic or fatty acids can be used as chain stoppers, such compounds include the well-known Cardura® esters (Shell Chemicals). Glycidyl ethers of monofunctional alcohols are suitably exemplified by 1,2-epoxy-3-allyloxypropane, 1-allyloxy-2,3-epoxypropane, 1,2-epoxy-3-phenoxypropane and 1-glycidyloxy-2-ethylhexane. It is also possible to use adducts of such compounds as glycidyl ethers of bisphenol A and oligomers thereof.

A hyperbranched macromolecule according to the present invention can in certain embodiments comprise at least one generation consisting of at least one compound of the same type as the nucleus. Such a generation is always preceded by a generation consisting of at least one branching or spacing chain extender and is optionally further extended or terminated by addition of at least one generation of at least one branching or spacing chain extender or of at least one chain stopper. An embodiment such as this implies a great flexibility in the formulation of the hyperbranched macromolecule according to the present invention. Macromolecules tailor-made for various application areas or specific uses can through the choice of chain extender easily be formulated. A macromolecule wherein the first generation consists of a branching chain extender, the second of a spacing chain extender, the third of a molecule of the nucleus type etc. and other macromolecules having such a variety in their structure are possible to formulate.

Suitable number of branching, spacing and/or terminating generations, i.e. generations consisting of branching chain extenders, spacing chain extenders or terminating chain stoppers, added to the monomeric or polymeric nucleus is within the range of 1–100, preferably 1–20, whereby at least one generation is a branching generation.

Allyl functional hyperbranched macromolecules are further embodiments of the present invention. The allyl functionality is in such embodiments obtained through allylation of the macromolecule by means of an allylhalide, such as allyl chloride or allyl bromide.

The present invention also comprises a process for preparing a hyperbranched macromolecule, which process includes the steps of:

a) reacting a branching chain extender with further molecules of the same chain extender and/or with further molecules of at least one other branching chain extender, which chain extender molecules have three reactive sites, at a temperature of 0°–300° C., preferably 50°–250° C., and in an amount corresponding to more than one chain extending generation, whereby a chain extending prepolymer having more than three reactive sites is yielded; and b) reaction between at least one prepolymer according to step (a) and a monomeric or polymeric nucleus having at least one reactive epoxide group, the reaction being carried out at a temperature of 0°–300° C., preferably 50°–250° C., whereby a hyperbranched macromolecule having more than one chain extending generation is obtained; which macromolecule c) optionally is further extended, at a reaction temperature of 0°–300° C., preferably 50°–250° C., by addition of further branching or spacing chain extender molecules, the addition being performed in a number of steps at least equal to requested number of generations; and/or d) optionally, in one or more steps, is chain terminated at a reaction temperature of 0°–300° C., preferably 50°–250° C., by addition of at least one monomeric or polymeric chain stopper forming a terminal generation.

The process can alternatively include the steps of:

e) reaction between a monomeric or polymeric nucleus having at least one reactive epoxide group and at least one monomeric or polymeric branching chain extender having at least three reactive sites to form a first or part of a first generation of a hyperbranched macromolecule, the reaction being performed at a temperature of 0°–300° C., preferably 50°–250° C.; after which reaction the first generation f) optionally is further extended, at a reaction temperature of 0°–300° C., preferably 50°–250° C., by addition of further branching or spacing chain extender molecules, the addition being performed in a number of steps at least equal to requested number of generations; and/or g) optionally, in one or more steps, is chain terminated at a reaction temperature of 0°–300° C., preferably 50°–250° C., by addition of at least one monomeric or polymeric chain stopper forming a terminal generation.

Furthermore, at least a part of one generation can involve a chain extension by means of addition of at least one compound of the same type as a nucleus. The generation including such a compound is preceded, according to step (b) or (e) by at least one generation consisting of at least one chain extender and can optionally be further extended or terminated by a generation consisting of at least one branching or spacing chain extender or of at least one chain stopper.

It is advisable to continuously remove water formed during one or more steps of the process according to the present invention. Suitable methods are for instance inlet of inert gas into the reaction vessel, vacuum distillation, azeotropic distillation and/or the like.

The reactions can be carried out without using any catalyst. A catalyst is, however, preferred and used in many cases and is then suitably selected from the group consisting of:

i) a Brønsted acid;

ii) a Lewis acid;

iii) a titanate;

iv) metallic zinc or an organic or inorganic zinc compound;

v) metallic tin or an organic or inorganic tin compound;

vi) metallic lithium or an organic or inorganic lithium compound; and vii) triphenylphosphine or a derivative thereof.

The catalyst is in preferred embodiments selected from the group consisting of the following Brønsted acids naphthalene sulphonic acid, p-toluene sulphonic acid, methane sulphonic acid, trifluoromethane sulphonic acid, trifluoroacetic acid, sulphuric acid or phosphoric acid or of the following Lewis acids $BF_3$, $AlCl_3$ or $SnCl_4$. Suitable catalysts are also tetrabutyl titanate, triphenylphosphine and lithium anhydride benzoate. A catalyst can be used as sole catalyst or in combinations including two or more catalysts.

The macromolecule according to the present invention can be used in many areas including in the preparation of products constituting or being part of alkyds, alkyd emulsions, saturated polyesters, unsaturated polyesters, epoxy resins, phenolic resins, polyurethane resins, polyurethane foams and elastomers, binders for radiation curing systems such as systems cured with ultraviolet (UV) and infrared (IR) light or electron-beams (EB), dental materials, adhesives, synthetic lubricants, microlithographic coatings and resists, binders for powder systems, amino resins, composites reinforced with glass, aramid or carbon/graphite fibres and moulding compounds based on urea-formaldehyde resins, melamine-formaldehyde resins or phenol-formaldehyde resins.

These and other objects and the attendant advantages will be more fully understood from the following detailed disclosure, given in conjunction with Examples 1–13 wherein:

EXAMPLE 1

Preparation of a three generations hyperbranched macromolecule of the polyester type, having a bisphenol A-diglycidylether based nucleus.

EXAMPLE 2

Preparation of a four generations hyperbranched macromolecule of the polyester type, having a bisphenol A-diglycidylether based nucleus.

EXAMPLE 3

Preparation of an air drying tall oil fatty acid alkyd based on the hyperbranched macromolecule of Example 1.

EXAMPLE 4

Preparation of an air drying tall oil fatty acid alkyd based on the hyperbranched macromolecule of Example 2.

EXAMPLE 5

Comparative example—Preparation of a conventional air drying high solid alkyd.

EXAMPLE 6

Preparation of an unsaturated polyester based on the hyperbranched macromolecule of Example 1.

EXAMPLE 7

Evaluation of products according to Examples 3–5.

EXAMPLE 8

Evaluation of products according to Example 6.

EXAMPLE 9

Preparation of a three generations hyperbranched macromolecule of the polyester type, having a triglycidyl isocyanurate nucleus.

EXAMPLE 10

Preparation of a four generations hyperbranched macromolecule of the polyester type, having a triglycidyl isocyanurate nucleus.

EXAMPLE 11

Preparation of an air drying oleic acid alkyd based on the hyperbranched macromolecule of Example 1.

EXAMPLE 12

Preparation of an air drying tall oil fatty acid alkyd based on the hyperbranched macromolecule of Example 10.

EXAMPLE 13

Preparation of an epoxidized hyperbranched macromolecule based on the product of Example 11.

While particular embodiments of the invention will be shown, it will be understood, of course, that the invention is not limited thereto since many modifications may be made, and it is, therefore, contemplated to cover by the appended claims modifications falling within the true spirit and scope of the invention.

EXAMPLE 1

600.0 g (4.47 moles) of 2,2-dimethylolpropionic acid, 60.0 g of triethylene glycol dimethyl ether and 0.6 g (0.006 mole) of sulfuric acid (96% by weight) were charged in a 4-necked reaction flask equipped with stirrer, pressure gauge, cooler and receiver. The temperature was raised from room temperature to 140° C. in 35 minutes, during which time all 2,2-dimethylolpropionic acid melted, thus giving a clear solution. A vacuum of 30–50 mm Hg was applied and the reaction was, under stirring, allowed to continue for 65 minutes until an acid value of 64.6 mg KOH/g was reached.

0.5 g (0.012 mole) of sodium hydoxide, 119.5 g (≈0.32 mole) of Epikote® 880 (a bisphenol A-diglycidyl ether based epoxide compound, Shell Chemicals, The Netherlands) and 0.7 g of lithium anhydride benzoate were now added to the reaction mixture. The temperature was raised to 150° C., giving a clear solution and a strong exothermic reaction. When the exotherm declined, a vacuum of 200 mm Hg was applied and the reaction was allowed to continue for 65 minutes until an acid value of 8.6 mg KOH/g was reached. The temperature was thereafter raised to 170° C. and the pressure was further reduced to 50 mm Hg and the reaction was allowed to continue for an additional 30 minutes giving a final acid value of 6.8 mg KOH/g.

Obtained hyperbranched macromolecule of polyester type exhibited the following properties:

| Acid value, mg KOH/g: | 6.8 |
| Hydroxyl value, mg KOH/g: | 490 (theor. value: 505) |
| Molecular weight, g/mole: | 2700 (theor. value: 2000) |

EXAMPLE 2

600.0 g (4.47 moles) of 2,2-dimethylolpropionic acid, 0.6 g (0.006 mole) of sulfuric acid (96% by weight) and 60.0 g of water were charged in a 4-necked reaction flask equipped with stirrer, pressure gauge, cooler and receiver. The temperature was raised from room temperature to 140° C. in 50 minutes, during which time all 2,2-dimethylolpropionic acid melted, thus giving a clear solution. A vacuum of 30–50 mm Hg was applied and the reaction was, under stirring, allowed to continue for 115 minutes until an acid value of 33.8 mg KOH/g was reached. 1.1 g (0.012 mole) of sodium hydroxide (46% aq.), 58.0 g (≈0.16 mole) of Epikote® 880 (a bisphenol A-diglycidyl ether based epoxide compound, Shell Chemicals, The Netherlands) and 0.7 g of lithium anhydride benzoate were now added to the reaction mixture. The temperature was raised to 155° C., giving a clear solution and a strong exothermic reaction. When the exotherm declined, a vacuum of 200 mm Hg was applied and the reaction was allowed to continue for an additional 60 minutes until an acid value of 9.3 mg KOH/g was reached.

Obtained hyperbranched macromolecule of polyester type exhibited the following properties:

| Acid value, mg KOH/g: | 9.3 |
| Hydroxyl value, mg KOH/g: | 485 (theor. value: 495) |
| Molecular weight, g/mole: | 3797 (theor. value: 3857) |

EXAMPLE 3

250.0 g of the polyester type hyperbranched macromolecule of Example 1, 562.1 g (1.97 moles) of tall oil fatty acid, 0.4 g of an esterification catalyst (Fascat® 4100, Atochem, The Netherlands) and 30 g of xylene were charged in a 4-necked reaction flask equipped with stirrer, nitrogen inlet, cooler and water trap (Dean-Stark). The temperature was during 45 minutes raised to 210° C. and the reaction was, under stirring, allowed to continue for 110 minutes. The temperature was thereafter raised to 220° C. and kept constant for 120 minutes after which time it was raised to 230° C. The reaction was now allowed to continue for a further 225 minutes until an acid value of 11.3 mg KOH/g was reached. The temperature was thereafter decreased to 200° C. and full vacuum was applied to remove residual xylene.

Obtained hyperbranched alkyd exhibited the following properties:

| | |
|---|---|
| Final acid value, mg KOH/g: | 12.4 |
| Hydroxyl value, mg KOH/g: | 8.3 |
| Theoretical molecular weight, g/mole: | 5800 |
| Viscosity at 23° C., mPas: | 3640 |
| Nonvolatile content, %: | 99.6 |

EXAMPLE 4

250.0 g of the polyester type hyperbranched macromolecule of Example 2, 585.1 g (2.05 moles) of tall oil fatty acid, 0.5 g of an esterification catalyst (Fascat® 4100, Atochem, The Netherlands) and 30 g of xylene were charged in a 4-necked reaction flask equipped with stirrer, nitrogen inlet, cooler and water trap (Dean-Stark). The temperature was during 50 minutes raised to 220° C. and the reaction was, under stirring, allowed to continue for 230 minutes after which additional 0.4 g of Fascat® 4100 was added. The reaction was thereafter allowed to continue for a further 120 minutes and thereafter raised to 230° C. The reaction was now allowed to continue for an additional 120 minutes until an acid value of 9.2 mg KOH/g was reached. The temperature was then decreased to 200° C. and full vacuum was applied to remove residual xylene.

Obtained hyperbranched alkyd exhibited the following properties:

| | |
|---|---|
| Final acid value, mg KOH/g: | 9.2 |
| Hydroxyl value, mg KOH/g: | 7.9 |
| Theoretical molecular weight, g/mole: | 11971 |
| Viscosity at 23° C., mPas: | 5600 |
| Nonvolatile content, %: | 100.0 |

EXAMPLE 5—Comparative Example 71.8 g of tall oil fatty acid, 17.5 g of o-phthalic anhydride, 17.0 g of pentaerythritol and 4% by weight of xylene were charged in a 4-necked reaction flask equipped with stirrer, nitrogen inlet, cooler and water trap (Dean-Stark). The temperature was raised to 160° C. and kept at this temperature for 10 minutes, after which time the temperature was raised by 0.5° C./minute until 240° C. was reached. An acid value of 9.0 mg KOH/g was obtained after 10 hours of esterification. The temperature was then reduced to 200° C. and full vacuum was applied to remove residual xylene.

Obtained conventional high solid alkyd exhibited the following properties:

| | |
|---|---|
| Final acid value, mg KOH/g: | 9.0 |
| Hydroxyl value, mg KOH/g: | 15 |
| Theoretical molecular weight, g/mole: | 4200 |
| Viscosity at 23° C., mPas: | 7050 |
| Nonvolatile content, %: | 100.0 |

EXAMPLE 6

200.0 g of the polyester type hyperbranched macromolecule of Example 1, 81.8 g (0.95 mole) of crotonic acid, 93.1 g (0.63 mole) of a mixture of capric and caprylic acid, 0.15 g of hydroquinone (10% by weight in ethanol) and 0.5 g of an esterification catalyst (Fascat® 4100, Atochem, The Netherlands) were charged in a 4-necked reaction flask equipped with stirrer, nitrogen inlet, cooler and water trap (Dean-Stark). The temperature was during 50 minutes raised to 170° C. The reaction was allowed to continue for 120 minutes, after which time the temperature was raised to 210° C. An acid value of 12.9 mg KOH/g was finally reached after a further 260 minutes at 210° C.

EXAMPLE 7

The following driers were mixed with products according to Examples 3, 4 and 5:

| | |
|---|---|
| Zirconium octoate: | 0.25% |
| Cobalt octoate: | 0.03% |

Above percentages were calculated as 100% metal on the nonvolatile content of the products.

An antiskin agent (Exkin® 2, Servo B.V., The Netherlands) was, furthermore, added in an amount of 0.30%.

The thus prepared lacquers were free of solvents and coated on glass panels at a film thickness of 50±5 µm (dry).

The drying time and hardness were measured as through dry by means of the Finger (thumb) Touch Method, pendulum hardness according to König after 7 days of drying and pencil hardness (scratch resistance) after 7 days of drying. All evaluations were carried at 23°±2° C. and 50±5% relative humidity.

Test Methods:
Finger Touch Method—U.S. Federal Test Method Standard 141, Method 4061.

Pendulum hardness—SS 184286 (identical to ISO 1522–1973).

Pencil Hardness—ASTM 3363–74 (1989)

The result is given below.

| Example no. | 3 | 4 | 5 |
|---|---|---|---|
| Drying time to through dry, hours: | 8–9 | 8–9 | 26 |
| Hardness after 7 days, König seconds: | 17 | 17 | 15 |
| Pencil hardness after 7 days: | H–2H | H–2H | 4B |

As can be seem from above result, hyperbranched alkyds exhibit substantially faster through dry and a substantially improved pencil hardness (scratch resistance) compared to conventional alkyds. Both types of alkyds can be regarded as so called high solids.

EXAMPLE 8

An ultraviolet (UV) curing lacquer, based on the unsaturated polyester according to Example 6, having the following formulation was prepared:

| | |
|---|---|
| Unsaturated polyester acc. to Example 6 | 50.0 g |
| Tripropylene glycol diacrylate | 25.0 g |
| Trimethylolpropane triethoxylate triacrylate | 25.0 g |
| Photoinitiator (Darocur 1173, Firma E. Merck, Germany) | 4.0 g |

The viscosity of obtained lacquer was 610 mPas at 25° C.

The lacquer was coated on glass panels at a film thickness of 30±5 µm (dry) and was UV cured immediately after application. UV curing was performed using a Labcure® Unit LC 9 from Wallace Knight, UK, having a belt speed of 20 m/min and an irradiation source consisting of medium pressure quartz mercury lamps of 80 Watts/cm.

Hardness was measured at 23°±2° C. and 50±5% relative humidity as pendulum hardness according to König.

Test Method:

Pendulum hardness—SS 184286 (identical to ISO 1522-1973).

The result is given below.

| Number of passages under UV lamp | Pendulum Hardness |
| --- | --- |
| 1 passage | 25 König seconds |
| 2 passages | 25 König seconds |
| 4 passages | 19 König seconds |
| 8 passages | 28 könig secons |
| 16 passages | 45 König seconds |

EXAMPLE 9

1000.0 g (7.46 moles) of 2,2-dimethylolpropionic acid, 100.0 g of water and 1.0 g (0.01 mole) of sulfuric acid (96% by weight) were charged in a 4-necked reaction flask equipped with stirrer, pressure gauge, cooler and receiver. The temperature was raised from room temperature to 140° C. in 90 minutes, during which time all 2,2-dimethylolpropionic acid melted, thus giving a clear solution. A vacuum of 30-50 mm Hg was applied and the reaction was, under stirring, allowed to continue for 85 minutes until an acid value of 74 mg KOH/g was reached 2.0 g of sodium hydoxide, 111.0 g (≈0.36 mole) of triglycidyl isocyanurate (Ciba-Geigy, Switzerland) and 1.1 g of lithium benzoate were now added to the reaction mixture. The temperature was raised to 150° C., giving a clear solution and a strong exothermic reaction. When the exotherm declined, a vacuum of 200 mm Hg was applied and the reaction was allowed to continue for 105 minutes until an acid value of 9.4 mg KOH/g was reached.

Obtained hyperbranched macromolecule of polyester type exhibited the following properties:

Acid value, mg KOH/g: 9.4

Hydroxyl value, mg KOH/g: 432

Average molecular weight, g/mole: 3023 (theor. value 2800)

EXAMPLE 10

1000.0 g (7.46 moles) of 2,2-dimethylolpropionic acid, 20.0 g of water and 1.0 g (0.01 mole) of sulfuric acid (96% by weight) were charged in a 4-necked reaction flask equipped with stirrer, pressure gauge, cooler and receiver. The temperature was raised from room temperature to 140° C. in 90 minutes, during which time all 2,2-dimethylolpropionic acid melted, thus giving a clear solution. A vacuum of 30-50 mm Hg was applied and the reaction was, under stirring, allowed to continue for 140 minutes until an acid value of 30 mg KOH/g was reached. 2.0 g of sodium hydoxide, 52.0 g (≈0.17 mole) of triglycidyl isocyanurate (Ciba-Geigy, Switzerland) and 1.0 g of lithium benzoate were now added to the reaction mixture. The temperature was raised to 150° C., giving a clear solution and a sligthly exothermic reaction. When the exotherm declined, a vacuum of 200 mm Hg was applied and the reaction was allowed to continue for 105 minutes until an acid value of 2.9 mg KOH/g was reached.

Obtained hyperbranched macromolecule of polyester type exhibited the following properties:

Acid value, mg KOH/g: 2.9

Hydroxyl value, mg KOH/g: 504 (theor. value: 505)

Average molecular weight, g/mole: 6200 (theor. value 5600)

EXAMPLE 11

48.4 g of the polyester type hyperbranched macromolecule of Example 1, 435.9 g (1.54 moles) of oleic acid, 0.5 g of p-toluene sulphonic acid and 68 g of xylene were charged in a 4-necked reaction flask equipped with stirrer, nitrogen inlet, cooler and water trap (Dean-Stark). The temperature was during 55 minutes raised to 180° C. and the reaction was, under stirring, allowed to continue for 60 minutes. The temperature was thereafter raised to 200° C. and kept constant for 480 until an acid value of 10.3 mg KOH/g was reached. The temperature was thereafter decreased to 200° C. and full vacuum was applied to remove residual xylene.

Obtained hyperbranched alkyd exhibited the following properties:

Final acid value, mg KOH/g: 10.3

Hydroxyl value, mg KOH/g: 124

Theoretical molecular weight, g/mole: 5200

Viscosity at 23° C., mPas: 12400

Nonvolatile content, %: 99.6

EXAMPLE 12

256.0 g of the polyester type hyperbranched macromolecule of Example 10, 594.9 g (2.09 moles) of tall oil fatty acid, 0.2 g of an esterification catalyst (Fascat® 4100, Atochem, The Netherlands) and 55 g of xylene were charged in a 4-necked reaction flask equipped with stirrer, nitrogen inlet, cooler and water trap (Dean-Stark). The temperature was during 70 minutes raised to 200° C. and the reaction was, under stirring, allowed to continue for 12 hours until an acid value of 10 mg KOH/g was reached. The temperature was then decreased to 200° C. and full vacuum was applied to remove residual xylene.

Obtained hyperbranched alkyd exhibited the following properties:

Final acid value, mg KOH/g: 9.9

Hydroxyl value, mg KOH/g: 15

Theoretical molecular weight, g/mole: 17700

Viscosity at 23° C., mPas: 10700

Nonvolatile content, %: 99.8

EXAMPLE 13

26.36 g of m-chloroperbenzoic acid and 750 ml of dichloromethane were at room temperature charged in a 3-necked reaction flask equipped with stirrer, nitrogen inlet and cooler. Obtained solution was cooled to 0° C. and 38.86 g of the product according to Example 11 dissolved in 250 ml of dichloromethane were now during 60 minutes instilled. Resulting reaction mixture was at 0° stirred during 120 minutes followed by precipitation of excess m-chloroperbenzoic acid. The reaction mixture was now allowed to react at room temperature for a further 18 hours. Resulting product was thereafter purified by extraction using 3×250 ml of 0.1M aqueous $Na_2S_2O_3$ followed by 3×250 ml of saturated aqueous $NaHCO_3$. The mixture was allowed to phase separate and the organic layer was removed. The final product was thereafter recovered by removal of solvent under full vacuum at 50° C. using a rotary evaporator.

Obtained product exhibited the following properties:

Epoxy equivalent weight (EEW-value), g/equivalent: 445 (theor. value 441)

Viscosity, 23° C., mPas: 12000

Nonvolatile content, %: 100.0

We claim:

1. A hyperbranched macromolecule of the polyester type comprising a central nucleus and at least one generation of a branching chain extender, said macromolecule comprising
   a) a monomeric or polymeric nucleus selected from the group consisting of
      i) an epoxide compound having at least one reactive epoxide group and
      ii) a reaction product of an epoxide compound, which reaction product has at least one reactive epoxide group;
   b) at least one generation comprising a branching monomeric or polymeric chain extender having at least three reactive sites, of which reactive sites
      i) at least one is a hydroxyl group or a hydroxyalkyl substituted hydroxyl group and at least one is a carboxyl group or
      ii) at least one is a hydroxyl group or a hydroxyalkyl substituted hydroxyl group and at least one is a terminal epoxide group; and, optionally,
   c) at least one generation comprising a spacing monomeric or polymeric chain extender having two reactive sites, one being a hydroxyl group or a hydroxyalkyl substituted hydroxyl group and one being a carboxyl group or terminal epoxide group; said macromolecule optionally terminated by at least one chain stopper, by epoxide or allyl functionalization, or by a combination of at least one chain stopper and epoxide or allyl functionalization.

2. The hyperbranched macromolecule according to claim 1 wherein the nucleus is selected from the group consisting of
   i) a glycidyl ester of a saturated monofunctional carboxylic acid having 1–24 carbon atoms;
   ii) a glycidyl ester of an unsaturated monofunctional carboxylic acid having 3–24 carbon atoms;
   iii) a glycidyl ester of a saturated or unsaturated di, tri or polyfunctional carboxylic acid having 3–24 carbon atoms;
   iv) a glycidyl ether of a saturated monofunctional alcohol having 1–24 carbon atoms;
   v) a glycidyl ether of an unsaturated monofunctional alcohol having 2–24 carbon atoms;
   vi) a glycidyl ether of a saturated or unsaturated di, tri or polyfunctional alcohol having 3–24 carbon atoms;
   vii) a glycidyl ether of a phenol or a reaction product thereof;
   viii) a mono, di or triglycidyl substituted isocyanurate;
   ix) an epoxide of an unsaturated monocarboxylic acid, a fatty acid or corresponding triglyceride, which acid has 3–24 carbon atoms;
   x) a reaction product between a glycidyl or epoxide ester or ether having x epoxide groups and a saturated or unsaturated aliphatic or cycloaliphatic carboxylic acid having y carboxylic groups, wherein x is an integer of between 2 and 20, y is an integer of between 1 and 10 and x–y≧1;
   xi) a reaction product between a glycidyl or epoxide ester or ether having x epoxide groups and an aromatic carboxylic acid having y carboxylic groups, wherein x is an integer of between 2 and 20, y is an integer of between 1 and 10 and x–y≧1;
   xii a reaction product between a glycidyl or epoxide ester or ether having x epoxide groups and an aliphatic, cycloaliphatic or aromatic hydroxyfunctional saturated or unsaturated carboxylic acid having y carboxyl groups, wherein x is an integer of between 2 and 20, y is an integer of between 1 and 10 and x–y≧1; and
   xiii an epoxidized polyolefin.

3. The hyperbranched macromolecule according to claim 1, wherein the nucleus is 1,2-epoxy-3-allyloxypropane, 1-allyloxy-2,3-epoxypropane, 1,2-epoxy-3-phenoxypropane, 1-glycidyloxy-2-ethylhexane, bisphenol A-diglycidyl ether or a reaction product thereof, diglycidyl terephthalate, epoxidized soybean fatty acid, epoxidized soybean oil, epoxidized polyvinyl alcohol or 3,4-epoxy-cyclohexyl methyl-3,4-epoxy cyclohexane carboxylate.

4. The hyperbranched macromolecule according to claim 1, wherein the hydroxyalkyl substituted hydroxyl groups in the branching or spacing chain extender has the general formula

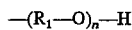

wherein $R_1$ is ethyl, propyl, butyl or mixtures thereof and wherein n is an integer between 1 and 100.

5. The hyperbranched macromolecule according to claim 4, wherein n is an integer between 1 and 30.

6. The hyperbranched macromolecule according to claim 1, wherein the branching chain extender is selected from the group consisting of:
   i) an aliphatic di, tri or polyhydroxyfunctional saturated or unsaturated monocarboxylic acid;
   ii) a cycloaliphatic di, tri or polyhydroxyfunctional saturated or unsaturated monocarboxylic acid;
   iii) an aromatic di, tri or polyhydroxyfunctional monocarboxylic acid;
   iv) an aliphatic monohydroxyfunctional saturated or unsaturated di, tri or polycarboxylic acid;
   v) a cycloaliphatic monohydroxyfunctional saturated or unsaturated di, tri or polycarboxylic acid;
   vi) an aromatic monohydroxyfunctional di, tri or polycarboxylic acid; and
   vii) an ester comprising two or more of the hydroxyfunctional carboxylic acids of i) through vi).

7. The hyperbranched macromolecule according to claim 6, wherein the branching chain extender is 2,2-dimethylolpropionic acid, α,α-bis-(hydroxymethyl)butyric acid, α,α,α-tris(hydroxymethyl)acetic acid, α,α-bis-(hydroxymethyl)valeric acid, α,α-bis(hydroxy)propionic acid, 3,5-dihydroxybenzoic acid, α,β-dihydroxypropionic acid, heptonic acid, citric acid, d-or l-tartaric acid, dihydroxymaloic acid or d-gluconic acid.

8. The hyperbranched macromolecule according to claim 1 wherein the hyperbranched macromolecule comprises at least one generation including at least one spacing monomeric or polymeric chain extender selected from the group consisting of:
   i) an aliphatic monohydroxyfunctional saturated or unsaturated monocarboxylic acid;
   ii) a cycloaliphatic monohydroxyfunctional saturated or unsaturated monocarboxylic acid;
   iii) an aromatic monohydroxyfunctional monocarboxylic acid;
   iv) an ester formed of two or more hydroxyfunctional carboxylic acids selected from the group consisting of (i), (ii) and (iii); and
   v) a lactone.

9. The hyperbranched macromolecule according to claim 8, wherein the spacing chain extender is hydroxyvaleric acid, hydroxypropionic acid, hydroxypivalic acid, glycolide, δ-valerolactone, β-propiolactone or ε-caprolactone.

10. The hyperbranched macromolecule according to claim 1 wherein said macromolecule is terminated with at least one monomeric or polymeric chain stopper selected from the group consisting of:
   i) an aliphatic or cycloaliphatic saturated or unsaturated monofunctional carboxylic acid or, where applicable, an anhydride thereof;
   ii) an aromatic monofunctional carboxylic acid;
   iii) a diisocyanate, an oligomer or an adduct thereof;
   iv) an epihalohydrin;
   v) a glycidyl ester of a monofunctional carboxylic acid having 1–24 carbon atoms;
   vi) a glycidyl ester of a monofunctional alcohol having 1–24 carbon atoms;
   ix) an adduct of an aromatic mono, di, tri or polyfunctional carboxylic acid or, where applicable, an anhydride thereof;
   vii) an epoxide of an unsaturated monocarboxylic acid or corresponding triglyceride, which acid has 3–24 carbon atoms;
   viii) an aliphatic or cycloaliphatic saturated or unsaturated monofunctional alcohol;
   ix) an aromatic monofunctional alcohol; and
   x) an adduct of a carboxylic acid and an alcohol.

11. The hyperbranched macromolecule according to claim 1 wherein the macromolecule is terminated with a chain stopper selected from the group consisting of lauric acid, linseed fatty acid, soybean fatty acid, tall oil fatty acid, dehydrated castor fatty acid, crotonic acid, capric acid, caprylic acid, acrylic acid, methacrylic acid, benzoic acid, para-tert-butylbenzoic acid, abietic acid, sorbinic acid, 1-chloro-2,3-epoxypropane, 1,4-dichloro-2,3-epoxybutane, epoxidized soybean fatty acid, trimethylolpropane diallyl ether maleate, 5-methyl-1,3-dioxane-5-methanol, 5-ethyl-1,3-dioxane-5-methanol, trimethylolpropane diallyl ether, pentaerythritol triallyl ether, pentaerythritol triacrylate, pentaerythritol triethoxylate triacrylate, toluene-2,4-diisocyanate, toluene-2,6-diisocyanate, hexamethylene diisocyanate and isophorone diisocyanate.

12. The hyperbranched macromolecule according to claim 1, wherein at least one generation includes at least one compound equal to a nucleus, the generation being followed by a generation consisting of at least one branching or spacing chain extender and optionally being further extended or terminated by a generation consisting of at least one branching or spacing chain extender or of at least one chain stopper.

13. The hyperbranched macromolecule according to claim 1, said macromolecule holding 1–100 branching, spacing or terminating generations, whereby at least one generation is a branching generation.

14. The hyperbranched macromolecule according to claim 1, said macromolecule holding 1–20 branching, spacing or terminating generations, whereby at least one generation is a branching generation.

15. The hyperbranched macromolecule according to claim 1, the macromolecule being epoxide functional, obtained through epoxidation of unsaturation within the macromolecule.

16. The hyperbranched macromolecule according to claim 1, the macromolecule being allyl functional, obtained through allylation of the macromolecule by means of an allylhalide.

17. The hyperbranched macromolecule according to claim 16, wherein the allylhalide is allylchloride or allylbromide.

18. The hyperbranched macromolecule according to claim 1 wherein the nucleus is a glycidyl ether of a condensation product between at least one phenol and at least one aldehyde or an oligomer thereof.

19. The hyperbranched macromolecule according to claim 1 wherein said macromolecule is terminated with at least one adduct between a carboxylic acid and an acrylate selected from the group consisting of hydroxyethyl acrylate, hydroxypropyl acrylate, trimethylolpropane diacrylate, pentaerythritol diacrylate, pentaerythritol triacrylate, hydroxy-functional acrylates of alkoxylated trimethylolpropane and hydroxy-functional acrylates of alkoxylated pentaerythritol.

20. The hyperbranched macromolecule according to claim 1 wherein said macromolecule is terminated with at least one adduct between a carboxylic acid and a hydroxy-substituted allyl ether.

* * * * *

UNITED STATES PATENT AND TRADEMARK OFFICE
CERTIFICATE OF CORRECTION

PATENT NO. : 5,663,247
DATED : September 2, 1997
INVENTOR(S) : Kent Sorensen, et al.

It is certified that error appears in the above-identified patent and that said Letters Patent is hereby corrected as shown below:

Column 13, line 10: "19" should read --28--

Column 13, line 11: "28" should read --45--

Column 13, line 12: "45" should read --63--

Signed and Sealed this

First Day of December, 1998

*Attest:*

*Attesting Officer*

BRUCE LEHMAN

*Commissioner of Patents and Trademarks*